(12) United States Patent
Fils

(10) Patent No.: US 7,831,756 B1
(45) Date of Patent: Nov. 9, 2010

(54) APPARATUS AND METHOD FOR DOCKING AND HOUSING A REMOVABLE ELECTRONIC DEVICE

(76) Inventor: Robert Louis Fils, 23491 Summit Rd., Los Gatos, CA (US) 95033

( * ) Notice: Subject to any disclaimer, the term of this patent is extended or adjusted under 35 U.S.C. 154(b) by 190 days.

(21) Appl. No.: 11/881,178

(22) Filed: Jul. 25, 2007

(51) Int. Cl.
  *G06F 13/00* (2006.01)
(52) U.S. Cl. ...................................... 710/303
(58) Field of Classification Search ............ 710/62–64, 710/72–74, 300–306, 313–315; 455/345–348, 455/418–420, 414.1; 381/86
  See application file for complete search history.

(56) References Cited

U.S. PATENT DOCUMENTS

| | | | |
|---|---|---|---|
| 6,595,608 B1 * | 7/2003 | Minelli et al. ............... | 312/296 |
| 6,934,568 B2 * | 8/2005 | Charlier et al. ........... | 455/575.3 |
| 6,939,155 B2 * | 9/2005 | Postrel ........................ | 439/297 |
| 7,263,032 B2 * | 8/2007 | Polany et al. ................ | 367/131 |
| 7,347,736 B2 * | 3/2008 | Ni ............................... | 439/660 |
| 2002/0077834 A1 * | 6/2002 | Estevez ....................... | 704/503 |
| 2007/0087725 A1 * | 4/2007 | Anderson .................... | 455/348 |
| 2008/0095382 A1 * | 4/2008 | Mott et al. .................... | 381/55 |

OTHER PUBLICATIONS

"Mobipod Series Model Specification", Car Head Unit (DIN Size).

\* cited by examiner

*Primary Examiner*—Raymond N Phan
(74) *Attorney, Agent, or Firm*—Haverstock & Owens LLP

(57) ABSTRACT

The present invention is directed to a housing unit, which allows an electronic device such as a portable digital audio player to be substantially hermetically sealed within an audio device. The electronic device is controllable by a user while housed with the housing unit. The audio device is able to be used in a vehicle such as a car, a camper, or a boat or in other common consumer products.

37 Claims, 10 Drawing Sheets

APPARATUS AND METHOD FOR DOCKING AND HOUSING A REMOVABLE ELECTRONIC DEVICE

FIELD OF THE INVENTION

The present invention is related to a docking station. More particularly, the present invention is related to a docking station for connecting an electronic device such as a portable digital audio player to an audio system in a vehicle such as a car, a camper, or a boat.

BACKGROUND OF THE INVENTION

Portable digital media players allow consumers to carry their music and other media with them wherever they go. Devices such as the iPod™ are rapidly gaining popularity. It is also desirable to connect these portable digital audio players to audio systems in vehicles such as cars, campers, or boats. Such a connection will allow music to be played through the speakers for multiple persons to enjoy, rather than through the headphones for one person to hear.

Currently, there are two main options for connecting a portable digital audio player to an audio system in a car, a camper, a boat or other vehicles. Using the first option, a portable digital audio player is connected to the vehicle audio system via a cassette adapter. A cassette-shaped interlace on one end of the adapter inserts into the vehicle audio system's tape deck. A mini-plug on the other end of the adapter inserts into the portable digital audio player's headphone jack. This connection allows the portable digital audio player to connect to the vehicle audio system through the in-dash cassette player. However, this option is problematic. First, the ease in which the connections are able to disconnect forces a user to carefully organize the tangle of cords required to connect the device to the tape player. Next, using this connection degrades the sound coming out of the device since it must be transferred from the device to the tape cassette and then from the cassette to the stereo.

A second option involves connecting a portable digital audio player to the vehicle audio system via a wireless FM transmitter, which allows the portable digital audio player's music to play wirelessly through any FM radio. This connection is also lossy and is subject to normal radio transmission problems such as difficulty in tuning and the inability to receive transmission in certain locations.

Both options require finding placement for the portable digital audio player somewhere in the vehicle, separate from the vehicle audio system. The second option also requires finding placement for the transmitter itself. In vehicles such as cars, campers, or boats, space is at a premium and it is difficult to find space to secure the portable digital audio player and/or the transmitter such that it would not fall or move about as the vehicle is moving. In addition, in a boat, audio systems are often made to be waterproof. The current methods of connecting a portable digital audio player to a vehicle audio system would not give it any protection from the elements, thus making water damage to the portable digital audio player more likely.

SUMMARY OF THE INVENTION

The present invention is directed to a docking station, which allows an electronic device such as a portable digital audio player to be secured and protected from the elements while connected to an audio system of a vehicle such as a car, a camper, or a boat; or connected to an audio system in other consumer products. The docking station is enclosed within a housing unit such that when the electronic coupling on the electronic device is coupled to the corresponding electronic coupling in the docking station, the body of the electronic device is enclosed entirely within the housing unit. A cover then seals to the housing unit to define a waterproof enclosure for the electronic device. In some embodiments of the present invention, the housing unit comprises an enclosure to securely hold the electronic device within the housing unit. In some embodiments of the present invention, the cover includes controls for controlling the audio system, including the now connected and enclosed portable digital audio player. In some embodiments of the present invention, the electronic device is controllable with a remote control. In some embodiments, the housing unit further comprises an enclosure having a unique geometry to securely hold the remote control as well as the electronic device.

Further, the invention comprises a housing unit containing a docking station for coupling to an electronic device such as a portable digital audio player. Once the electronic device is securely docked, the cover is able to be moved to a closed position, thus coupling with the housing unit to define a waterproof enclosure for containing the electronic device. In some embodiments of the present invention, an audio system control panel is located on the cover. The cover is able to connect to the housing unit in various ways. In one embodiment, the cover is connected to the bottom of the housing unit such that it must be flipped upwards to the closed position. In an alternative embodiments, the cover is connected to the top of the housing unit such that it flips downwards to the closed position or connected to the side of the housing unit and swings open and closed. In yet another alternative, the cover is completely detachable from the housing unit and must be snapped into place to the closed position. In some embodiments, when the cover is in the closed position, the portable digital audio player is connected and secured within the waterproof housing unit and protected from the elements.

In addition, the audio system and the docking station are connected to the vehicle's engine such that when the engine is turned off and the key removed, a series of beeps will sound to remind the owner that the electronic device is still connected and enclosed within the housing unit. This reminder system helps to prevent the owners from leaving the electronic device in the vehicle unintentionally.

DETAILED DESCRIPTION OF THE INVENTION

Figure 1:
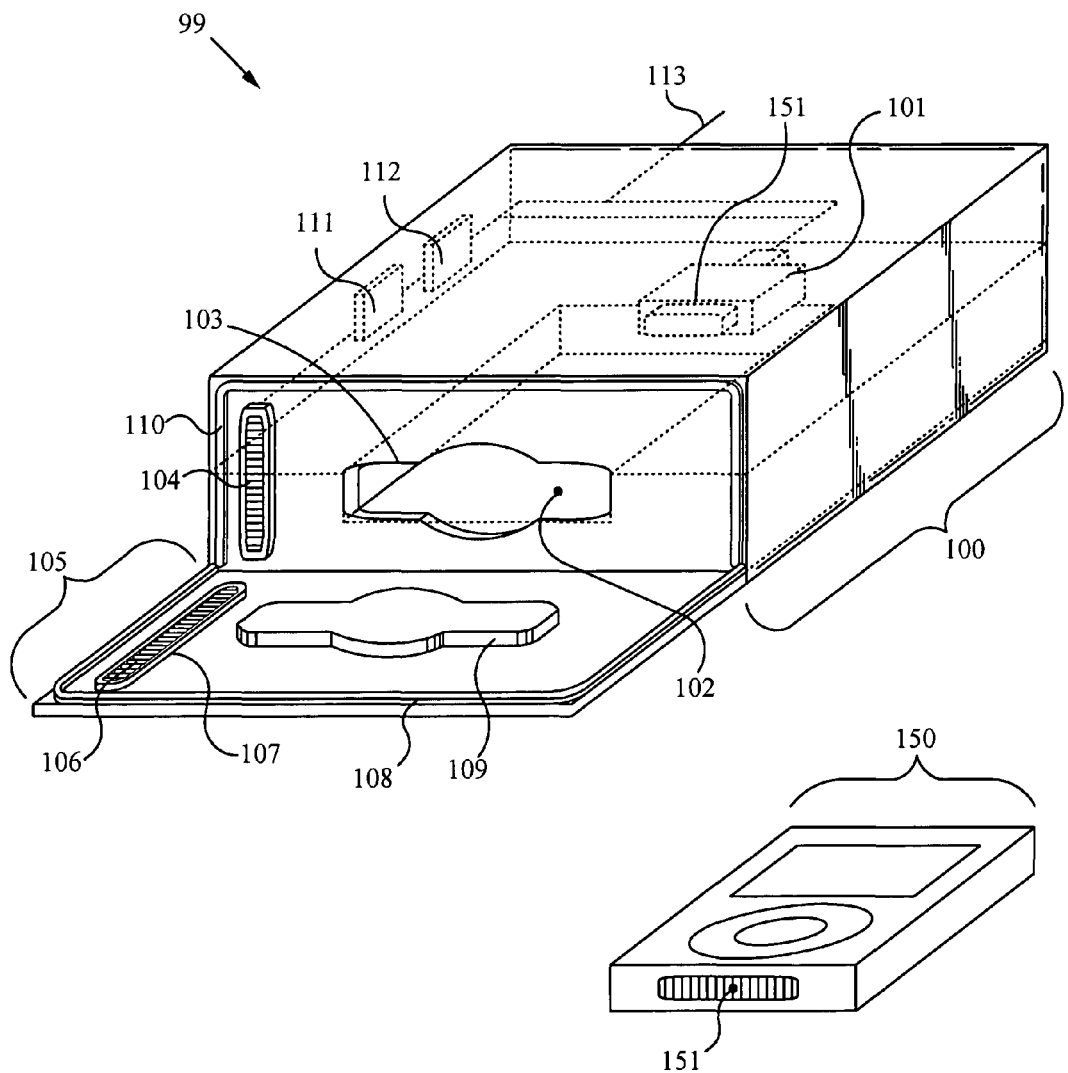
FIG. 1 illustrates a perspective view of an electronic device and housing unit according to some embodiments of the present invention.

FIG. 1 illustrates a perspective view of an electronic device 150 and a housing unit 100 with a form fitting cavity 102 and device-housing connector 101 for electronically coupling the electronic device 150 with the housing unit 100. In some embodiments of the present invention, the electronic device 150 is a portable digital media device such as an iPod™, Palm™, Zen™, Zune™, or other digital media devices, MP3 players and music phones. In other embodiments of the present invention, the electronic device 150 supports MP4 format or DivX Media Format devices. Alternatively, the electronic device 150 supports any appropriate audio or video recording and transmission format.

In some embodiments of the present invention, the housing unit 100 is part of an audio system 99 in a vehicle, such as for example a car, a camper, or a boat. In other embodiments of the present invention, the housing unit 100 is a stand alone audio device. In yet other embodiments of the present invention, the housing unit 100 is integrated into common consumer products, appliances or accouterments. Examples of other items in which the housing unit 100 is able to be integrated with include, but are not limited to: barbecue grills or other outdoor kitchen units; hot tubs; refrigerators; furniture; shower and bathroom appliances; bicycles; motorcycle or skiing helmets; backpacks or purses; among others.

A device-housing connector 101 couples with the electronic device connector 151. As shown, the device-housing connector 101 is the male end of connector and the electronic device 150 has a connector 151 which is the female counterpart to the device-housing connector 101. It will be readily apparent to those ordinarily skilled in the art that in alternative embodiments, the device connector 151 is the male end of a connector pairing and that the device-housing connector 101 is the female end of the connector pairing. It will also be apparent to those having ordinary skill in the art, that although the connectors 101 and 151 are shown having a particular geometry and pin layout, any connectors which electrically couple the device 150 with the housing 100 are equally envisioned. In some embodiments of the present invention the electronic coupling means are selected from among: RCA cables, multi-pin connectors, 8P8C connectors, DE-9 connectors, USB connectors, and 30-pin connectors, among others.

To couple the electronic device 150 to the housing unit 100, a user inserts the electronic device 150 through the form fitting opening 103 and completely into the form fitting cavity 102, resulting in the electronic device 150 being fitted entirely within the housing unit 100.

The control interface 105 is coupled to the housing unit 100. As shown, the control interface 105 is attached to the bottom edge of the housing unit 100 and the control interface 105 swings upward to couple with the top edge of the housing unit 100 to define an enclosure for containing the electronic device 150 within the housing device 100. It will be readily apparent to those ordinarily skilled in the art that the control interface 105 is able to couple to the housing unit in a wide variety of ways, including, but not limited to, flip down designs and detachable designs (discussed in FIGS. 4A & 4B below).

As shown, the control interface 105 is electronically coupled to the housing unit 100 through the interface connector 104 and the controller connector 106. A user interfaces the control interface via controls (not shown) on the face of the control interface 105. In some embodiments, the interface connector 104 is further coupled to the circuitry 111 of the housing unit 100, including the device-housing connector 101. In some embodiments of the present invention, the device housing connector 101 is coupled to additional circuitry 112 which allows particular electronic devices 150 to be played and controlled by the housing unit 100. In certain embodiments of the present invention, the additional circuitry 112 is programmed with media player device manufacturer-specific proprietary circuitry such as that needed to play the Apple® Accessory Protocol. Finally, the housing circuitry is coupled to the output 113. In some embodiments of the present invention, the output 113 is an audio/video output.

It is an object of the present invention that the connection between the housing unit 100 and the control interface 105 be substantially hermetic. As such, the control interface 105 possesses a number of sealing gaskets: the interface connector gasket 107, the control interface gasket 108 and the cavity interface gasket 109. The housing unit 100 has corresponding surface geometry, such as the raised nature of the interface connector 104 and the ridge 110, such that when the control interface 105 is coupled to the housing unit 100, the gasket features 107, 108 and 109 substantially hermetically seal the control interface 105 with the housing unit 100. In alternative embodiments of the present invention, the housing unit 100 contains gasket features and the control interface 105 possesses a unique geometry to substantially hermetically couple the two. Preferably, the sealing gaskets 107, 108 and 109 are comprised of a resilient material such as rubber.

In some embodiments of the present invention, the housing unit 100 is designed to accommodate a particular electronic device 150. The housing unit 100 as shown in FIG. 1 accomplishes this object of the invention by providing a form fitting cavity 102 (indicated by dashed lines) located within the housing unit 100 and a form fitting opening 103 allowing the electronic device 150 to be inserted into the cavity 102. Furthermore, the form fitting opening 103 also accommodates the cavity interface gasket 109 after the electronic device 150 is inserted into the cavity 102, creating a substantially hermetic seal around the cavity 102. Furthermore, upon coupling with the housing unit 100, the control interface gasket 108 provides additional constant pressure on the electronic device 150 and further ensures that the device 150 is fully inserted and coupled in the housing unit 100.

Figure 2:
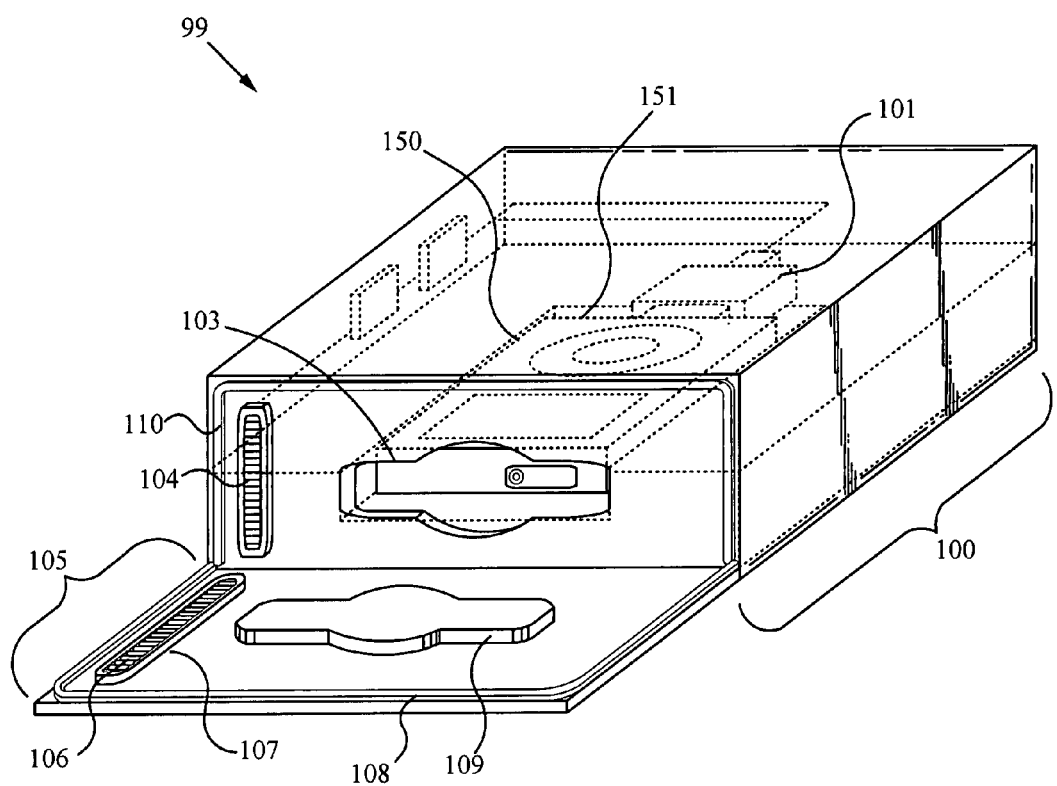
FIG. 2 illustrates a perspective view of a housing unit containing an electronic device according to some embodiments of the present invention.

FIG. 2 illustrates the electronic device 150 positioned within the housing unit 100. As shown, when the electronic device 150 is inserted properly in the form fitting cavity 102, the device connector 151 couples with the device-housing connector 101. When the control interface 105 is closed over the housing unit 100, the cavity interface gasket 109 substantially hermetically seals the electronic device 150 within the cavity 102, the interface connector gasket 107 substantially hermetically seals the interface connector 104 and the controller connector 106 and the control interface gasket 108 substantially hermetically seals the control interface 105 to the housing unit 100.

Figure 3:
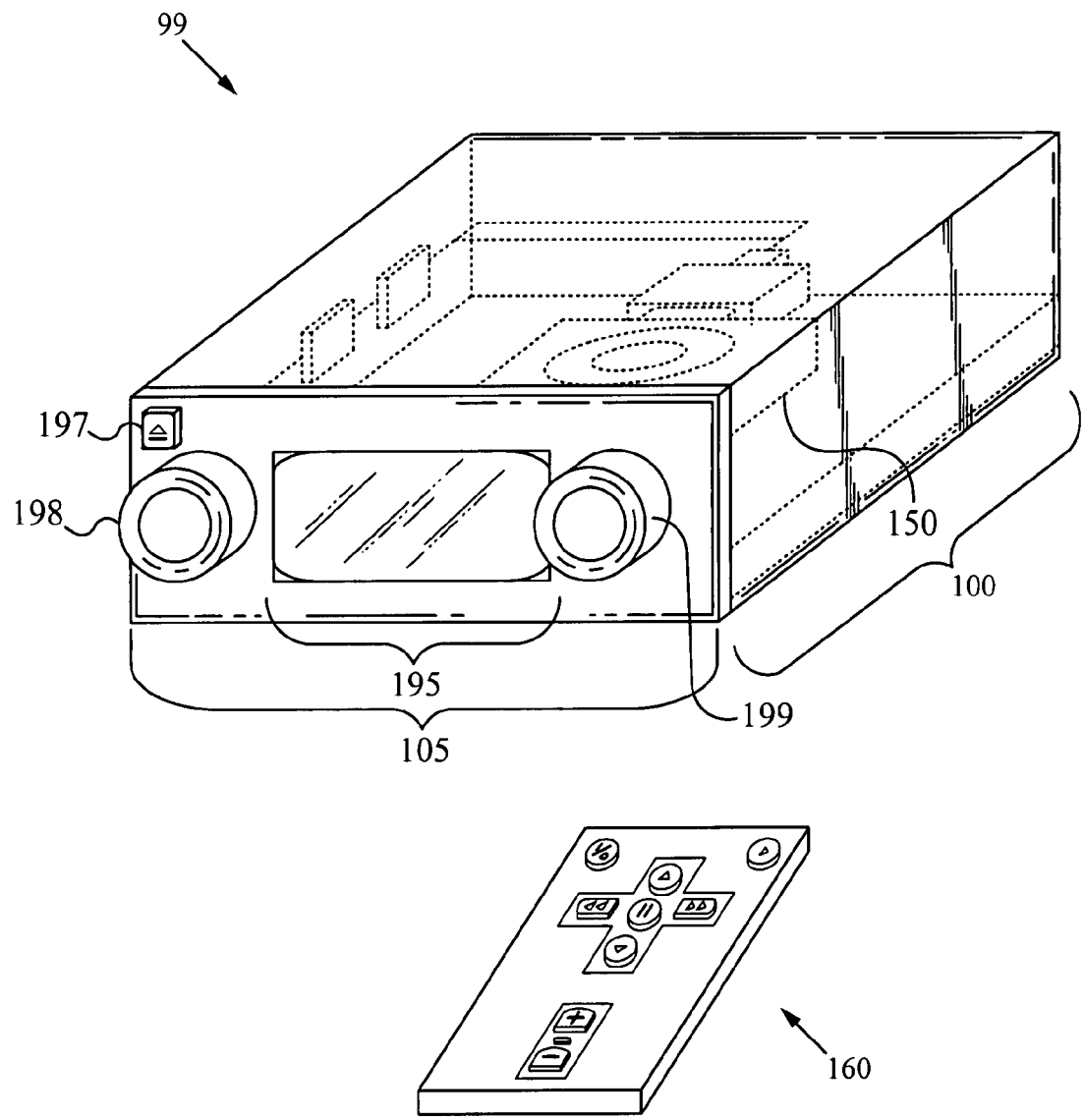
FIG. 3 illustrates a perspective view of a housing unit containing an electronic device with a control interface coupled to the housing unit according to some embodiments of the present invention.

FIG. 3 illustrates the housing unit 100 containing an electronic device 150 with the control interface 105 coupled to the housing unit 100. As shown the control interface 105 has a number of controls 197, 198 and 199. Furthermore, the control interface 105 has a screen 195 for displaying file information from the electronic device 150 as well as video information, if applicable. In some embodiments of the present invention, a remote control 160 is used to control the electronic device 150 when it is housed within the housing unit 100. In some embodiments, an infra red signal is used to transmit and receive information between the remote control 160 and the control interface 105 and the housing unit 100. In an alternative embodiment, the electronic device 150 is controlled by controls on the steering wheel. In alternative embodiments, the electronic device 150 is controlled wirelessly by implementing technologies such as IEEE 802.11, Bluetooth®, Radio Frequency (RF) or any other appropriate wireless methodology.

To connect an electronic device 150 to an audio system in a vehicle via the housing unit 100, the user first moves the controller interface 105 to an open position. The user then inserts the electronic device 150 into the housing unit 100 such that the device connector 151 couples to the corresponding device-housing connector 101 inside the housing unit 100. The user then moves the controller interface 105 to a closed position, forming a waterproof enclosure housing the electronic device 150 within. The controller interface 105 allows the user to operate the electronic device 150, now safely enclosed within the housing unit 100, and play content, such as music or other audio or video, through the vehicle's audio system. Once the electronic device 150 is coupled within the housing unit 100, the user is able to access and control the functions of the electronic device 150 through the control panel.

In alternative embodiments, the electronic device 150 is a portable digital audio player implementing MPEG-1, MPEG-2 and/or MPEG-4 technology, which enables the portable digital audio player to play videos and movies. It will be readily apparent to those having ordinary skill in the art that other video compression formats are able to be implemented in the present invention as well. In yet another alternative embodiment, the electronic device 150 is a portable digital video player and the portable digital video player is coupled to the housing unit 100.

Figure 4A:
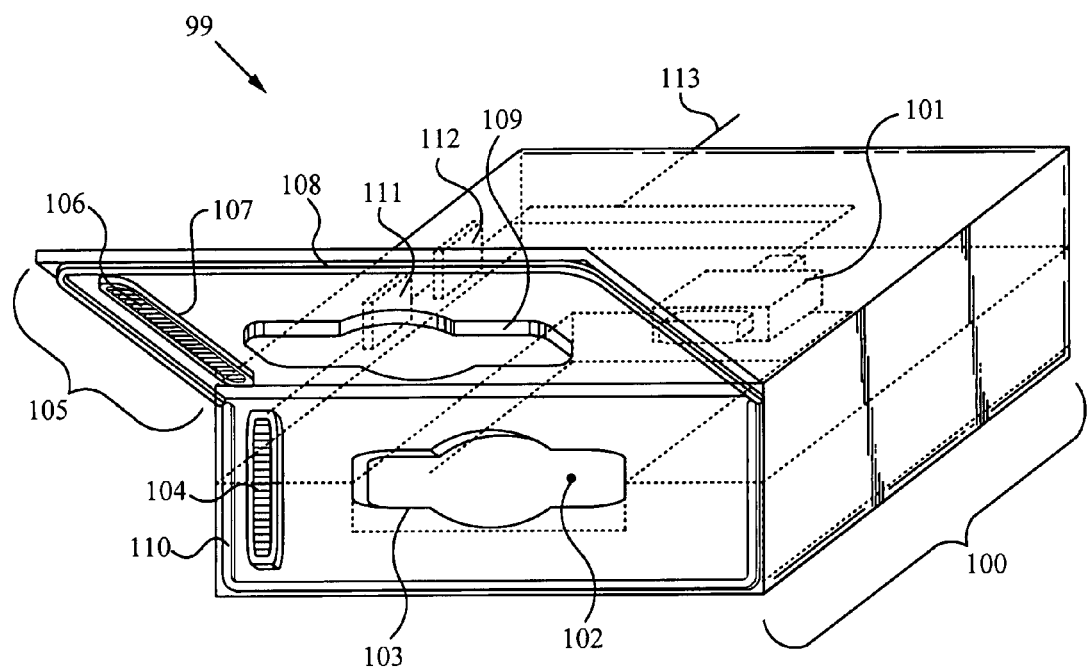
FIG. 4A illustrates a perspective of a housing unit and a flip-down control interface.

As discussed above, the control interface 105 is coupled to the housing unit 100 in a variety of ways according to certain embodiments of the present invention. FIG. 4A illustrates a perspective view of the housing unit 100 and the control interface 105. As shown, the control interface 105 is coupled to the top edge of the housing unit 100 and flips down, wherein the bottom edge of the control interface 105 becomes removably coupled with the bottom edge of the housing unit 100. As the bottom edge of the control interface 105 swings downward and couples with housing unit 100, the control interface 105 defines an enclosure for containing the electronic device 150.

Figure 4B:
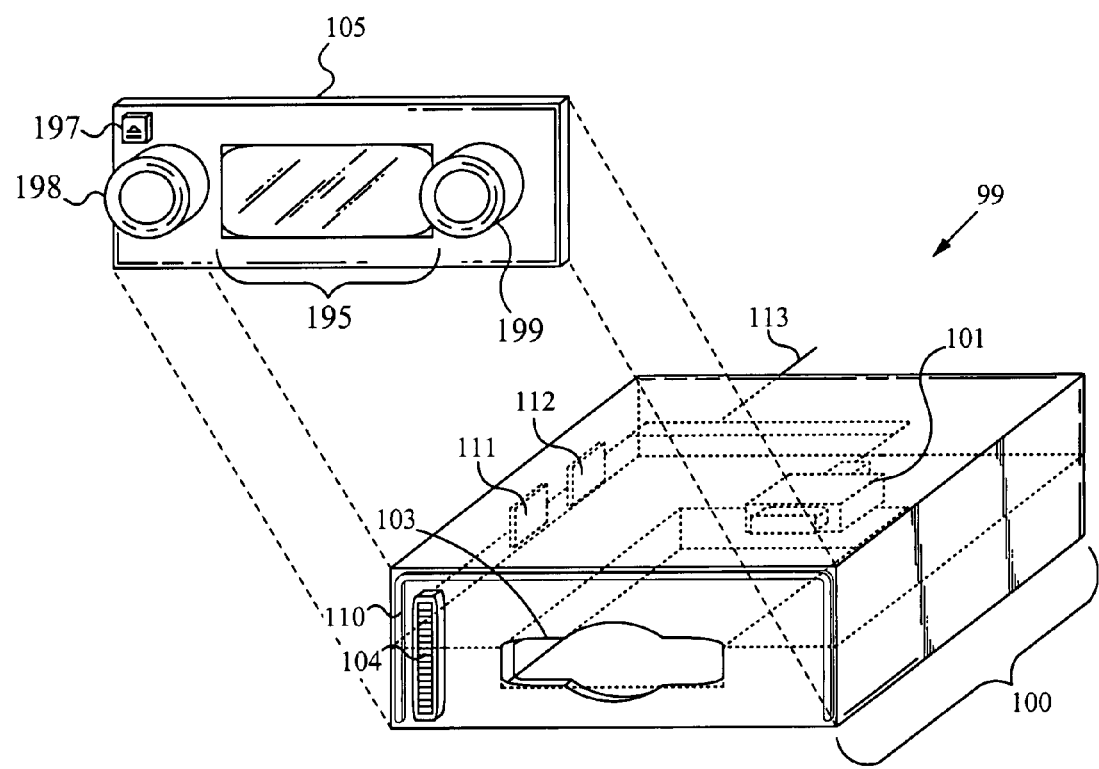
FIG. 4B illustrates a perspective of a housing unit a attachable and detachable control interface.

FIG. 4B illustrates yet another embodiment of the present invention where the control interface 105 is detachably coupled with the housing unit 100. As shown, the control interface 105 is both completely attachable and detachable from the housing unit 100. As such, a user detaches the control interface 105 from the housing unit 100 in order to insert an electronic device (not shown) into the form fitting opening 103. Once the electronic device 150 is completely inserted and coupled within the housing unit 100, the user is able to re-attach the control interface 105 and control the electronic device 150 therein. Once the control interface 105 is coupled to the housing unit 100, such coupling defines an enclosure for containing the electronic device 150 within the housing unit 100. Preferably, the control interface 105 seals the housing unit 100 and defines a waterproof enclosure.

Those skilled in the art will recognize from the context of the descriptions of the embodiments that coupled shall refer to any number of ways to couple. In alternative embodiments, the control interface 105 is coupled to the housing unit 100 via a snap connector, a hinge mount, or a tongue and groove mechanism, among other means. Those skilled in the art will recognize from the context of the descriptions of the embodiments that various means of coupling the control interface 105 to the housing unit 100 define a waterproof enclosure for the containment and protection of the electronic device 150 housed within.

As explained above, the housing unit 100 is part of a vehicle media system according to some embodiments of the present invention. When the user is ready to leave the vehicle, he will move the controller interface 105 to an open position and remove the electronic device 150 from the housing unit 100 by decoupling the device connector 151 from the corresponding device-housing connector 101 inside the housing unit 100. After removing the electronic device 150, the user will then move the controller interface to a closed position. It is another object of some embodiments of the present invention to provide a means for alerting a user that the electronic device 150 is coupled within a housing unit 100. According to these embodiments, the audio system and the housing unit 100 are coupled to the vehicle's engine such that when the engine is turned off and the key removed, a series of beeps will sound to remind the owner that the electronic device 150 is still connected and enclosed within the housing unit 100. This reminder system helps to prevent the owners from leaving the electronic device in the vehicle unintentionally.

FIGS. 1-4B illustrate a housing unit 101 for a specific device 150. Such a design is well-suited for users with a single electronic audio/video device. However, often times users have multiple audio/video devices. Similarly, many consumers choose to frequently purchase new audio/video devices as new features are marketed and old devices become outdated. It is therefore another object of the invention to provide a device housing unit and audio/video player that is able to accommodate a wide variety of electronic devices as well as devices yet to be developed.

Figure 5A:
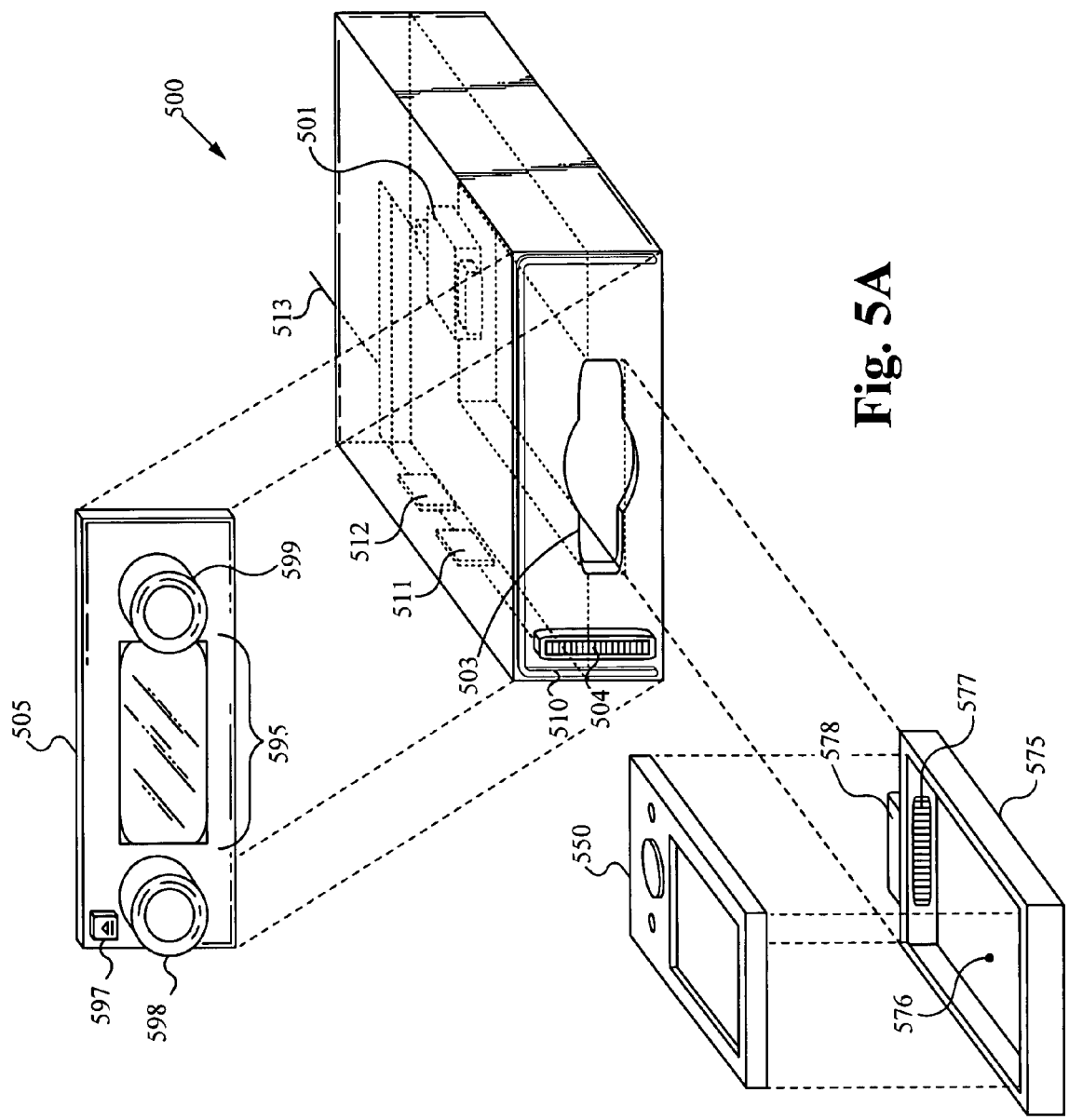
FIG. 5A illustrates a partially exploded view of an alternative design for an electronic device housing unit with control interface utilizing a cartridge according to some embodiments of the present invention.
Figure 5B:
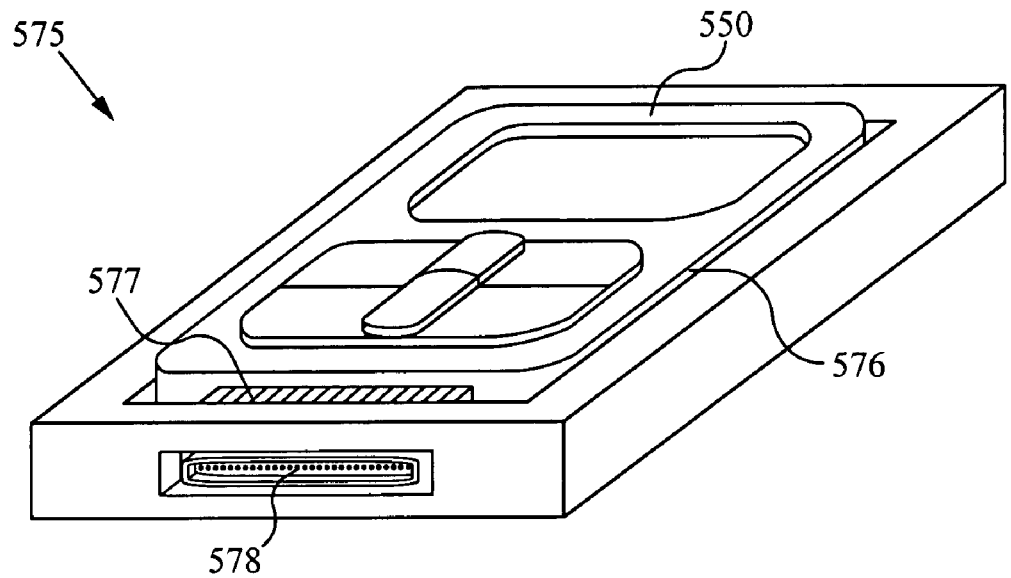
FIG. 5B illustrates a particular cartridge for housing an electronic device according to some embodiments of the present invention.
Figure 5C:
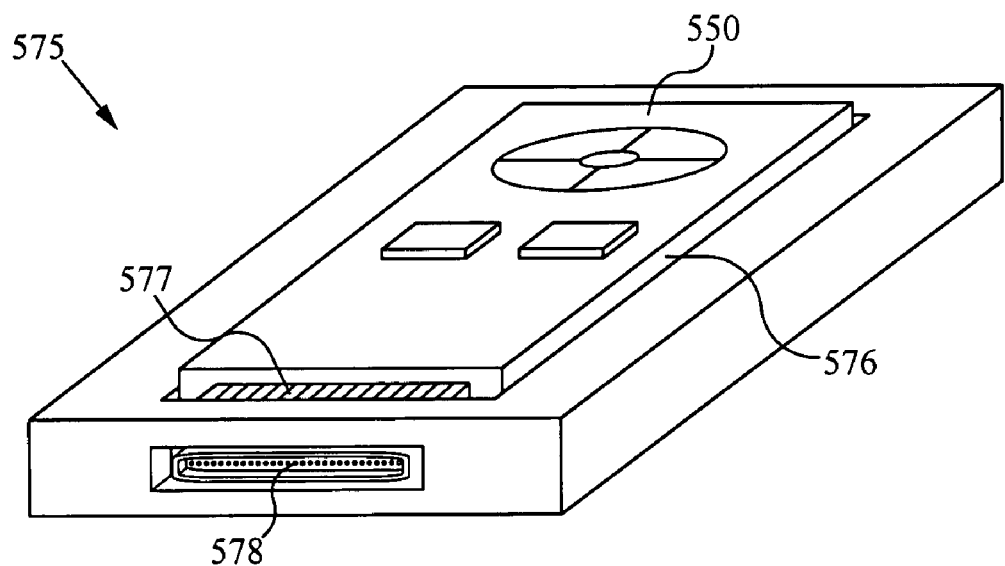
FIG. 5C illustrates another particular cartridge for housing an electronic device according to some embodiments of the present invention.
Figure 5D:
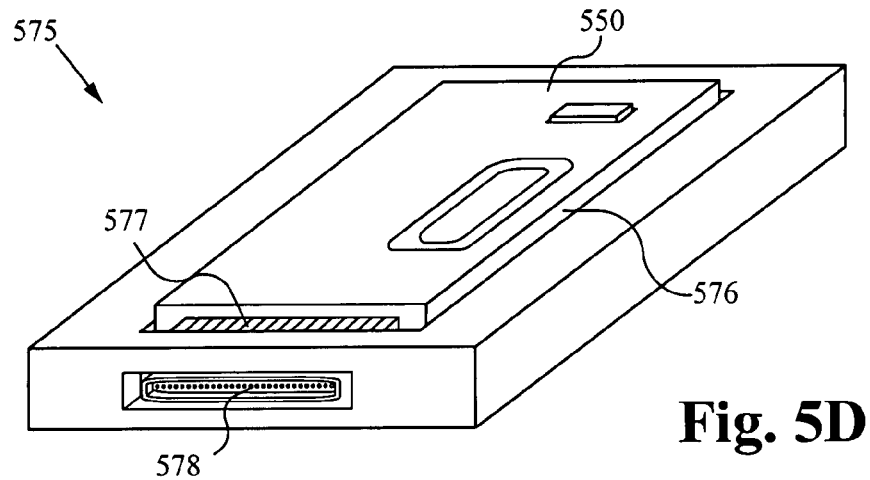
FIG. 5D illustrates another particular cartridge for housing an electronic device according to some embodiments of the present invention.
Figure 5E:
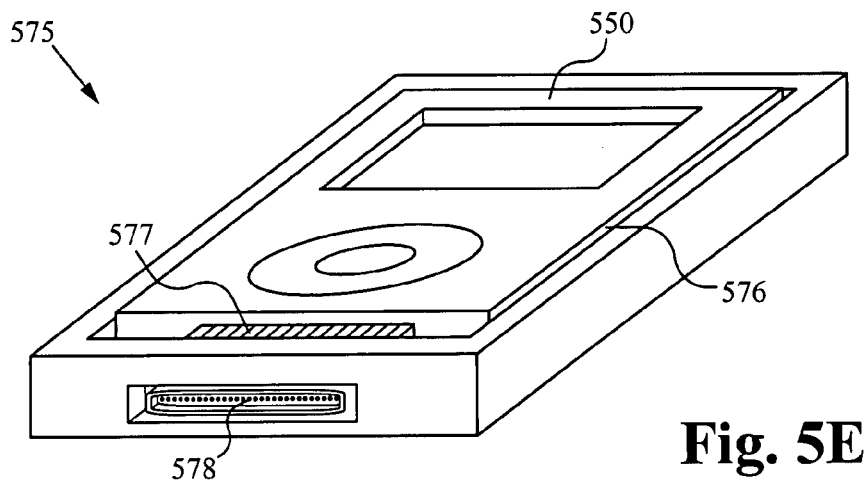
FIG. 5E illustrates another particular cartridge for housing an electronic device according to some embodiments of the present invention.
Figure 5F:
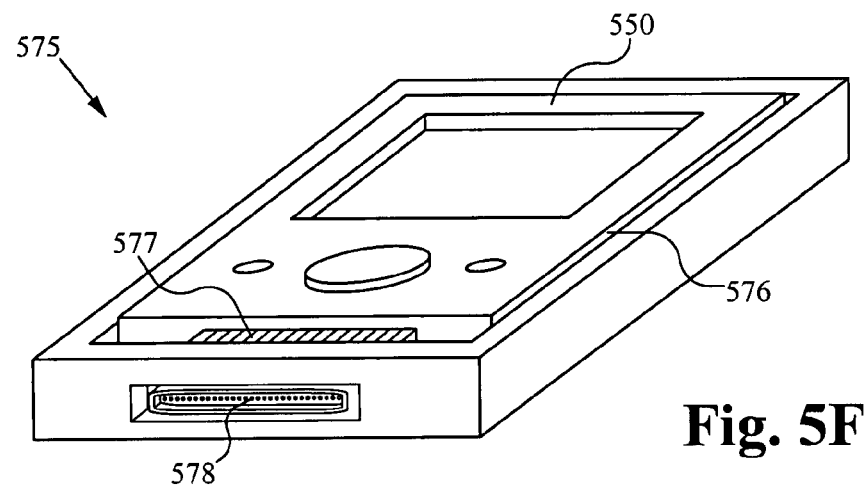
FIG. 5F illustrates another particular cartridge for housing an electronic device according to some embodiments of the present invention.

FIG. 5A illustrates a partially exploded view of an alternative design for an electronic device 550 housing unit 500 with control interface 505 according to some embodiments of the present invention. According to this design, the housing unit 500 is not device specific, meaning that the housing unit 500 accommodates a number of different electronic devices 550. To this end, an additional cartridge 575 is employed to hold a variety of electronic devices 550.

The housing unit 500 comprises an opening 503 which receives the cartridge 575 and an interface connector 504. Furthermore, the housing unit 500 comprises a surface geometry, such as the ridge 510, such that when the control interface 505 is coupled to the housing unit 500, the gasket features (not shown) substantially hermetically seal the control interface 505 with the housing unit 500. The housing unit 500 also comprises an opening 503, a housing-cartridge connector 501 and circuitry 511, 512.

In some embodiments of the present invention, the cartridge 575 comprises a form-fitting cavity 576 to hold an electronic device 550. The cartridge 575 also comprises a device-cartridge connector 577 and a cartridge-housing connector 578. The opening 503 allows access to a cavity 502 which accommodates the cartridge 575 fitted with an electronic device 550. When the cartridge 575 is fully inserted in the cavity 502, the cartridge-housing connector 578 couples with the housing-cartridge connector 501. When the control interface 505 is coupled to the housing unit 500, appropriately placed gaskets (not shown) located on the back of the control interface 505 further ensure the cartridge 575 is fully inserted in the housing unit 500 and that the connectors maintain sufficient contact with each other.

FIGS. 5B-5F illustrate a number of cartridges 575 which are able to be used with the housing unit 500. As shown, each cartridge 575 has a form-fitting cavity 576 which snugly fits a particular electronic device 550. Also, each cartridge has the same outer dimension and has an identical cartridge-housing connector 578, such that each cartridge may be inserted, connected to and controlled by the housing unit 500. Each device-specific cartridge has a unique geometry such that the connector (not shown) of the device 550 aligns with the device-cartridge connector 577 when the device is placed in the cartridge 575.

Figure 6B:
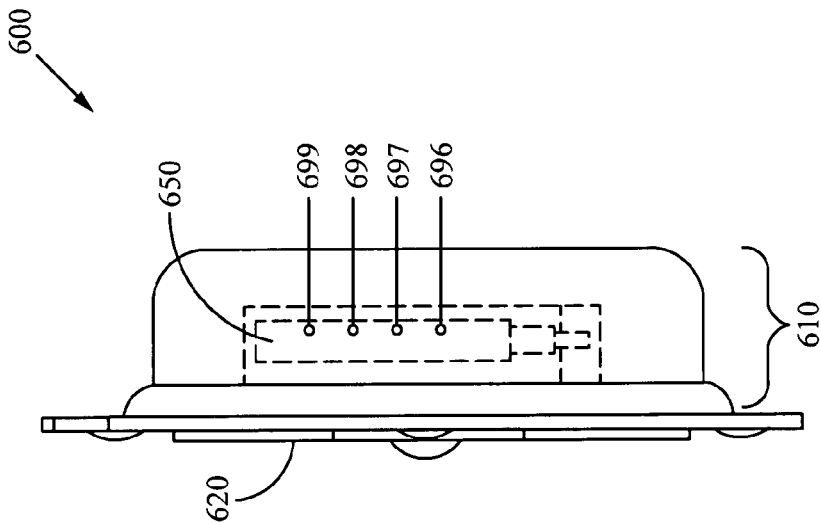
FIG. 6B illustrates a side schematic view of housing unit with an enclosure containing an electronic device and with component outputs according to some embodiments of the present invention.
Figure 6A:
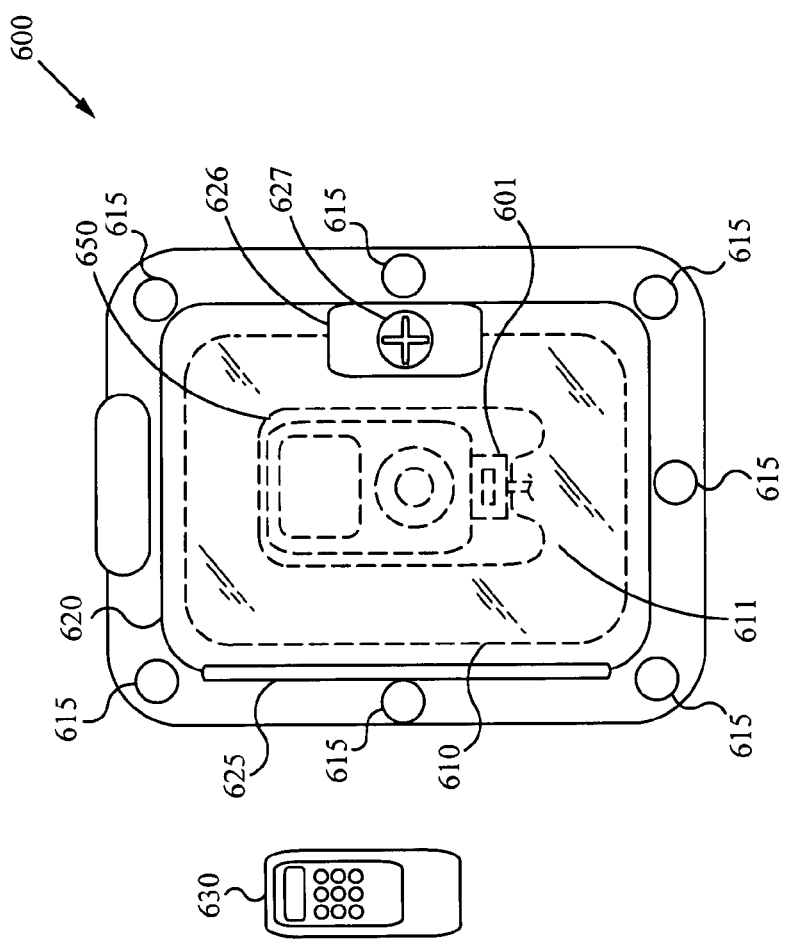
FIG. 6A illustrates a front schematic view of a housing unit with an enclosure containing a remote control controllable electronic device according to some embodiments of the present invention.

FIG. 6A illustrates a schematic front view of an alternative configuration for a media device docking station according to some embodiments of the present invention. FIG. 6A shows a housing unit 600 holding an electronic device 650 (indicated by dashed lines). The housing unit 600 includes an enclosure 610 (indicated by dashed lines) which is sealable by a cover 620. The housing unit 600 is integrated into a vehicle or other product with connectors 615. In some embodiments of the present invention, the enclosure 610 contains a formed fitted recessed area 611 with an unique geometry such that an electronic device 650 fits securely within the recessed area 611.

In some embodiments of the present invention, the enclosure 610 passively holds the electronic device 650 and substantially hermetically seals the electronic device 650 therein. In other embodiments of the present invention, the enclosure 610 contains the necessary circuitry (not shown) to operate the electronic device 650. In some embodiments, the housing unit 600 is coupled to speakers (not shown) for broadcasting music contained within the electronic device 650 or coupled to a display screen (not shown) for displaying picture or video files contained on the electronic device 650.

The electronic device 650 includes an electronic device connector (not shown) used to couple with the necessary circuitry to play the electronic device 650. A device-housing connector 601 (indicated by dashed lines) couples with the electronic device connector. The device-housing connector 601 electronically couples the electronic device 650 with the rest of the circuitry (not shown) needed to play the electronic device 650. As shown, the device-housing connector 601 is the male end of the connector and the electronic device 650 has a connector which is the female counterpart to the device-housing connector 601. It will be readily apparent to those ordinarily skilled in the art that in alternative embodiments, the device connector is the male end of a connector pairing and that the device-housing connector 601 is the female end of the connector pairing. It will also be apparent to those having ordinary skill in the art, that although the connectors are shown having a particular geometry and pin layout, any connectors which electrically couple the device 650 with the housing 610 are equally envisioned. In some embodiments of the present invention the electronic coupling means are selected from among: RCA cables, multi-pin connectors, 8P8C connectors, DE-9 connectors, USB connectors, and 30-pin connectors, among others.

The housing unit 600 encloses the electronic device 650 within the enclosure 610 with a cover 620. The cover 620 rotates on a hinge 625. In some embodiments of the present invention, the cover 620 also includes a kick plate 626 and a handle 627 to access the cover 620. In some embodiments of the present invention, the cover 620 substantially hermetically seals the enclosure 610 when in the closed position. As such, the electronic device 650 is able to be used in wet conditions and environments which would normally put the device 650 at risk of failure or shorts.

In some embodiments of the present invention, a remote control 630 is used to interface with the electronic device 650. In some embodiments, the remote control 630 is a RF remote control, however other types of remote controls are equally envisioned. In some embodiments of the present invention, the cover 620 comprises a clear surface. According to these embodiments, a remote control 630 may be used to interface with the electronic device 650 while the electronic device 650 is enclosed behind the clear surface cover 620.

FIG. 6B illustrates a side view of the housing unit 600. As shown, the cover 620 seals an electronic device 650 (indicated by dashed lines) within an enclosure 610. The electronic device 650 is coupled to the appropriate circuitry (not shown) and a number of peripheral connections 699, 698, 697, and 696 are located on the side of the housing unit 600. In some embodiments of the present invention the peripheral connections 699, 698, 697, and 696 comprise audio and video outputs.

Figure 7:
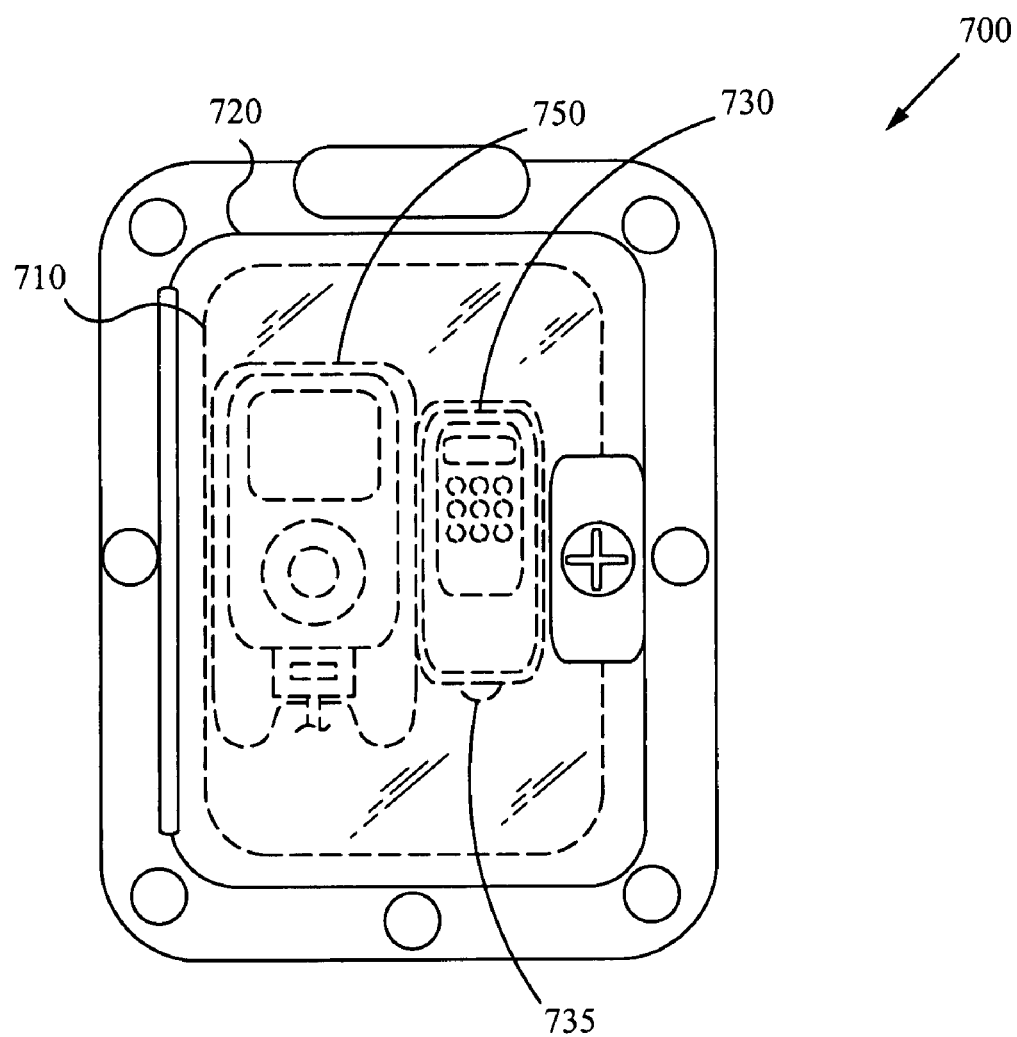
FIG. 7 illustrates a front schematic view of an alternative housing unit with an enclosure containing an electronic device and remote control according to some embodiments of the present invention.

FIG. 7 illustrates a schematic front view of an alternative configuration for the housing unit 700, wherein the housing unit contains an electronic device 750 and a remote control 730 housed within and substantially hermetically sealed by the cover 720. According to this embodiments, the enclosure 710 contains a remote control dock 735 (indicated by dashed lines), and the remote control 730 is configured to fit securely within the remote control dock 735. In some embodiments of the present invention, the remote control dock 735 comprises a recharging dock to recharge the remote control 730.

The present invention provides an easy and convenient way to play a portable electronic device in an audio system. The present invention does not require coupling through a tape player or via radio waves as does the two main options for connecting a portable digital media player to an audio system in the prior art. Furthermore the electronic device is substantially hermetically sealed within the audio system such that a user is able to control the device in a wet environment without fear of damaging the audio system or the electronic device.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

What is claimed is:

1. An apparatus for housing a removable electronic device, the apparatus comprising:
a housing unit comprising:
a sealable enclosure configured to house a removable electronic device;
an opening configured to accept the electronic device; and
a connector located within the sealable enclosure configured to couple with the electronic device;
a cover, detachably coupled to the housing unit comprising a controller interface, wherein the controller interface couples to the housing unit to define the sealed enclosure, and wherein the controller interface comprises a user interface for controlling the electronic device when the electronic device is housed in the housing unit.

2. The apparatus for housing a removable electronic device according to claim 1, wherein the opening is an electronic device specific form-fitting opening.

3. The apparatus for housing a removable electronic device according to claim 1, wherein the opening is an electronic device generic opening, wherein the opening accommodates a number of different sized electronic devices, and wherein the enclosure is an electronic device generic enclosure which accommodates a number of different sized electronic devices.

4. The apparatus for housing a removable electronic device according to claim 1, wherein the connector is selected from among RCA cables, multi-pin connectors, 8P8C connectors, DE-9 connectors, USB connectors, and 30-pin connectors.

5. The apparatus for housing a removable electronic device according to claim 1, wherein the apparatus further comprises:
a receiver for receiving wireless transmissions; and
a wireless remote with a transceiver, wherein the transceiver sends wireless information to the receiver, and wherein the wireless information controls the electronic device contained within the housing unit.

6. The apparatus for housing a removable electronic device according to claim 1, wherein the controller interface comprises controls coupled to the steering wheel of a vehicle.

7. The apparatus for housing a removable electronic device according to claim 1, the controller interface further comprising a display screen.

8. The apparatus for housing a removable electronic device according to claim 1, wherein the controller interface detachably couples with the housing unit.

9. The apparatus for housing a removable electronic device according to claim 1, wherein the housing unit further comprises an alert mechanism for alerting a user that the electronic device is coupled within the housing unit when a vehicle's engine is turned off and the key removed.

10. The apparatus for housing a removable electronic device according to claim 1, further comprising a cartridge for holding an electronic device, wherein the electronic device couples with the cartridge and the cartridge couples with the connector within the housing unit, thus coupling the electronic device to the housing unit through the cartridge.

11. The apparatus for housing a removable electronic device according to claim 1, wherein the apparatus further comprises:
a receiver for receiving control transmissions; and
a wired remote to send information to the receiver to control the electronic device contained within the housing unit.

12. The apparatus for housing a removable electronic device according to claim 5, wherein the sealable enclosure is configured to house the electronic device and the wireless remote.

13. The apparatus for housing a removable electronic device according to claim 5, wherein the receiver and transceiver utilize wireless transmission technologies selected from among IEEE 802.11 standard wireless technology, Bluetooth® wireless technology, Infra-red transmission technology, and Radio Frequency technology.

14. The apparatus for housing a removable electronic device according to claim 7, wherein the display screen displays video files selected from among DivX Media, MPEG-1, MPEG-2 and MPEG-4 video files.

15. The apparatus for housing a removable electronic device according to claim 13, wherein the cover is configured to allow the transmission of wireless transmission technologies therethrough.

16. An apparatus for housing and controlling a removable electronic device, the apparatus comprising:
a housing unit comprising:
an enclosure for housing the electronic device, wherein the enclosure hermetically seals the electronic device within the housing unit; and
a connector for coupling with the electronic device; and
a user interface for controlling the electronic device when the electronic device is housed in the housing unit, wherein the user interface detachably couples from the housing unit.

17. The apparatus for housing and controlling a removable electronic device according to claim 16, wherein the enclosure is an electronic device specific form-fitting enclosure.

18. The apparatus for housing and controlling a removable electronic device according to claim 16, wherein the enclosure accommodates a number of different sized electronic devices.

19. The apparatus for housing and controlling a removable electronic device according to claim 16, wherein the connector is selected from among RCA cables, multi-pin connectors, 8P8C connectors, DE-9 connectors, USB connectors, and 30-pin connectors.

20. The apparatus for housing and controlling a removable electronic device according to claim 16, wherein the user interface further comprises:
a receiver for receiving wireless transmissions; and
a wireless remote control device with a transceiver, wherein the transceiver sends wireless information to the receiver to control the electronic device contained within the housing unit.

21. The apparatus for housing and controlling a removable electronic device according to claim 16, wherein the user interface comprises controls coupled to the steering wheel of a vehicle.

22. The apparatus for housing and controlling a removable electronic device according to claim 16, wherein the user interface further comprises a display screen.

23. The apparatus for housing and controlling a removable electronic device according to claim 16, wherein the housing unit further comprises an alert mechanism for alerting a user that the electronic device is coupled within the housing unit when a vehicle's engine is turned off and the key removed.

24. The apparatus for housing and controlling a removable electronic device according to claim 16, further comprising a cartridge for holding an electronic device, wherein the electronic device couples with the cartridge and the cartridge couples with the connector within the housing unit, thus coupling the electronic device to the housing unit through the cartridge.

25. The apparatus for housing and controlling a removable electronic device according to claim 16, wherein the user interface further comprises:
   a receiver for receiving control transmissions; and
   a wired remote control device to send information to the receiver to control the electronic device contained within the housing unit.

26. The apparatus for housing and controlling a removable electronic device according to claim 20, wherein the receiver and transceiver utilize wireless transmission technologies selected from among IEEE 802.11 standard wireless technology, Bluetooth® wireless technology, Infra-red transmission technology, and Radio Frequency technology.

27. The apparatus for housing and controlling a removable electronic device according to claim 22, wherein the display screen displays video files selected from among DivX Media, MPEG-1, MPEG-2 and MPEG-4 video files.

28. A method of coupling a removable electronic device to an audio apparatus in a vehicle, the method comprising:
   coupling a removable electronic device within a housing unit;
   hermetically sealing the electronic device within the housing unit;
   controlling the electronic device from outside the housing unit when the electronic device is sealed within the housing unit; and
   detachably coupling a user interface to the housing unit to hermetically seal the electronic device within the housing unit, wherein the controller interface comprises a user interface for controlling the electronic device when the electronic device is housed in the housing unit.

29. The method of coupling a removable electronic device to an audio apparatus in a vehicle according to claim 28, further comprising broadcasting signals from a remote control having a transceiver to the user interface, wherein the user interface is configured with a receiver for receiving wirelessly broadcasted signals.

30. The method of coupling a removable electronic device to an audio apparatus in a vehicle according to claim 28, wherein the user interface is coupled to steering wheel controls, and wherein the steering wheel controls are used to control the electronic device when the electronic device is sealed within the housing unit.

31. The method of coupling a removable electronic device to an audio apparatus in a vehicle according to claim 28, the method further comprising:
   displaying video content from the electronic device on a display screen.

32. The method of coupling a removable electronic device to an audio apparatus in a vehicle according to claim 28, the method further comprising:
   generating an alert, the alert conveying that the electronic device is coupled with the housing unit and that a vehicle's engine is shut off and the keys removed.

33. The method of coupling a removable electronic device to an audio apparatus in a vehicle according to claim 28, further comprising:
   coupling the electronic device to a cartridge; and
   coupling the cartridge with the housing unit, thereby coupling the electronic device within the housing unit.

34. An audio and video device apparatus for housing a removable electronic device, the apparatus comprising:
   a housing unit comprising:
      a sealable enclosure configured to removably house a removable electronic device and a remote control unit, wherein the electronic device is controllable by the remote control unit via wireless transmission signals; and
      a connector for coupling the electronic device with a media system; and
   a cover rotatably coupled to the housing unit with at least one hinge, wherein the cover is configured to swing open to allow access to the opening and to swing closed to substantially hermetically seal the sealable enclosure, and wherein the cover is configured to allow the transmission of wireless transmission signals therethrough.

35. The audio and video device apparatus for housing a removable electronic device according to claim 34, wherein the connector is selected from among RCA cables, multi-pin connectors, 8P8C connectors, DE-9 connectors, USB connectors, and 30-pin connectors.

36. The audio and video device apparatus for housing a removable electronic device according to claim 35, wherein the wireless transmission signals are selected from among IEEE 802.11 standard wireless technology, Bluetooth® wireless technology, Infra-red transmission technology, and Radio Frequency technology.

37. The audio and video device apparatus for housing a removable electronic device according to claim 35, wherein the housing unit further comprises an alert mechanism configured to alert a user that the electronic device is coupled within the housing unit when a vehicle's engine is turned off and the key removed.

* * * * *